(12) United States Patent
Horng et al.

(10) Patent No.: US 6,652,147 B2
(45) Date of Patent: Nov. 25, 2003

(54) BEARING STRUCTURE

(75) Inventors: Alex Horng, Kaohsiung (TW); Yin-Rong Hong, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 40 days.

(21) Appl. No.: 10/022,348

(22) Filed: Dec. 20, 2001

(65) Prior Publication Data

US 2003/0118258 A1 Jun. 26, 2003

(51) Int. Cl.⁷ .............................. F16C 33/02
(52) U.S. Cl. ............ 384/295; 384/215; 384/276; 384/439
(58) Field of Search .................. 384/114, 119, 384/215, 276, 279, 295, 428, 439

(56) References Cited

U.S. PATENT DOCUMENTS 3,704,048 A * 11/1972 Yoshikawa et al. ......... 384/192
3,953,089 A * 4/1976 Dainin ....................... 384/291
4,033,642 A * 7/1977 Sorgatz et al. .............. 384/215
5,414,934 A * 5/1995 Schlessmann .............. 384/295
5,593,231 A * 1/1997 Ippolito ...................... 384/114
6,314,649 B1 * 11/2001 Linsbauer ................... 384/295

* cited by examiner

Primary Examiner—Thomas R. Hannon
(74) Attorney, Agent, or Firm—Bacon & Thomas, PLLC

(57) ABSTRACT

A bearing structure includes a bearing having a shaft hole formed by an inner wall of the bearing. The outer periphery of the bearing has multiple outer walls and multiple deformable zones. The multiple outer walls are located at the axial direction of the same radius circumference with the center of the shaft hole as a center of circle thereof. Each of the multiple deformable zones is provided on the outer periphery of the bearing between any two outer walls, and is deformable to absorb an outer stress. When the bearing is closely mounted in a shaft tube during a punching process, the multiple deformable zones of the outer face of the bearing may absorb the outer stress, thereby preventing the inner wall of the bearing from being deformed.

5 Claims, 3 Drawing Sheets

BEARING STRUCTURE

BACKGROUND OF THE INVENTION

1. Field of the Invention

The present invention relates to a bearing structure, and more particularly to a bearing structure, wherein the outer surface of the bearing is provided with multiple deformable zones that may absorb an outer stress, thereby preventing the outer stress from directly affecting the inner wall of the bearing. When the bearing is closely mounted in a shaft tube during a punching process, the multiple deformable zones of the outer face of the bearing may absorb the outer stress, thereby preventing the inner wall of the bearing from being deformed, so that the inner periphery of the inner wall may maintain a smooth state.

2. Description of the Related Art

A conventional bearing in accordance with the prior art is shown in FIGS. 4 and 5, wherein FIG. 4 is a cross-sectional view of a conventional bearing mounted in a shaft tube in accordance with the prior art, and FIG. 5 is a locally enlarged view of a conventional bearing mounted in a shaft tube in accordance with the prior art.

As shown in FIG. 4, a shaft 91 is axially extended through a shaft hole 90 of a bearing 92 which is mounted in a shaft tube 93. The outer wall of the bearing 92 and the inner wall of the shaft tube 93 form a close fit mounting fixing state. Thus, the bearing 92 and the shaft tube 93 may be combined in a punching manner. In the punching process, when an excessive outer stress is applied on the outer wall of the bearing 92, the outer wall of the bearing 92 will produce a structural deformation, or even the inner wall of the bearing 92 will also produce a structural deformation.

As shown in FIG. 5, when the bearing 92 produces a structural deformation due to the punching process, the inner wall 94 of the shaft hole 90 of the bearing 92 will also produce a structural deformation, thereby reducing the diameter of the shaft hole 90, and the inner wall 94 of the shaft hole 90 of the bearing 92 will form a coarse surface due to the irregular deformation. When the shaft 91 is rotated in the coarse surface, rotation of the shaft 91 is inconvenient and uneven, so that the shaft 91 will be worn out easily, thereby reducing the lifetime of the shaft 91.

SUMMARY OF THE INVENTION

Accordingly, for overcoming the above-mentioned shortcomings, the present invention is to provide a bearing structure, wherein the outer surface of the bearing is provided with multiple deformable zones that may absorb an outer stress, thereby preventing the outer stress from directly affecting the inner wall of the bearing. When the bearing is closely mounted in a shaft tube during a punching process, the multiple deformable zones of the outer face of the bearing may absorb the outer stress, thereby preventing the inner wall of the bearing from being deformed, so that the inner periphery of the inner wall may maintain a smooth state.

The primary objective of the present invention is to provide a bearing structure, wherein the outer surface of the bearing is provided with multiple deformable zones to absorb the outer stress, thereby preventing the outer stress from directly affecting the inner wall of the bearing, so that the present invention may prevent the inner wall of the bearing from being deformed.

A secondary objective of the present invention is to provide a bearing structure, wherein the outer wall of the bearing is provided with multiple deformable zones which are distributed around the outer periphery of the bearing synmmetrically, thereby evenly preventing the outer stress from directly affecting the inner wall of the bearing, so that the present invention may prevent the inner wall of the bearing from being deformed unevenly.

In accordance with the present invention, there is provided a bearing structure including a bearing having a shaft hole formed by an inner wall of the bearing. The outer periphery of the bearing has multiple outer walls and multiple deformable zones. The multiple outer walls are extending around sections of a periphery of the bearing, each of the outer walls having a same radius relative to a center of the shaft hole. Each of the multiple deformable zones is provided on the outer periphery of bearing between a respective two outer walls, and is deformable to absorb stress on said outer walls. When the bearing is closely mounted in a shaft tube during a punching process, the multiple deformable zones of the outer face of the bearing may absorb the outer stress, thereby preventing the inner wall of the bearing from being deformed.

Further benefits and advantages of the present invention will become apparent after a careful reading of the detailed description with appropriate reference to the accompanying drawings.

DETAILED DESCRIPTION OF THE PREFERRED EMBODIMENTS

The bearing structure in accordance with the present invention mainly includes multiple deformable zones axially extended between two outer walls. Each of the multiple deformable zones is deformable to absorb all or a part of outer stress. When the bearing is closely mounted in a shaft tube during a punching process, the outer stress on the outer wall of the bearing is limited on the multiple deformable zones of the outer face of the bearing, thereby preventing the inner wall of the bearing from being deformed.

Figure 1:
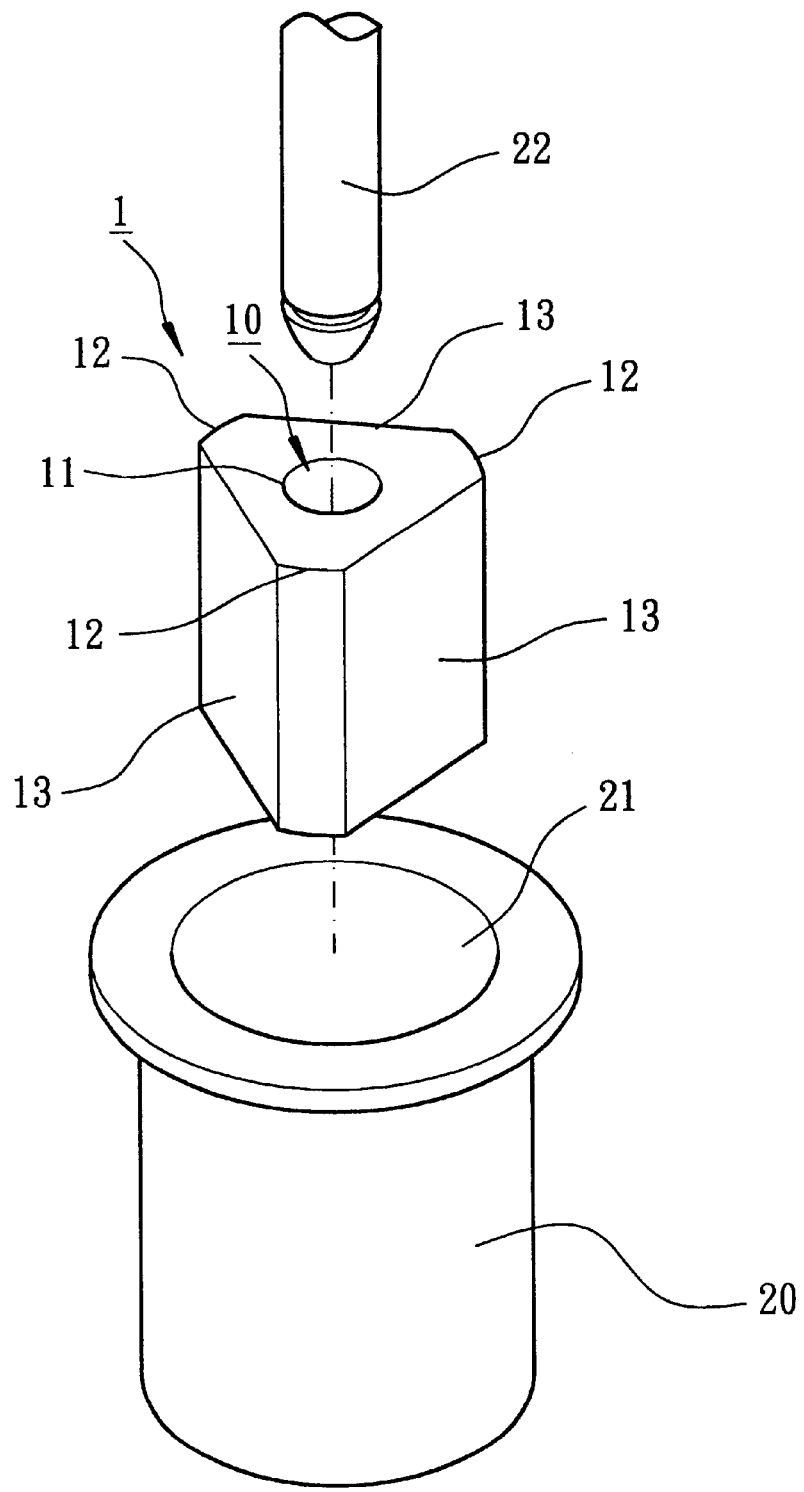
FIG. 1 is an exploded perspective view of a bearing structure in accordance with a first embodiment of the present invention.
Figure 2:
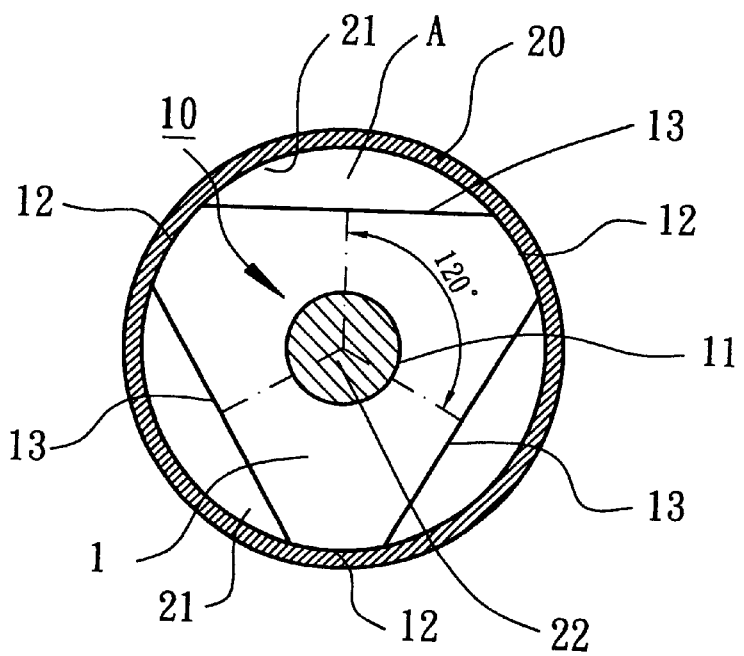
FIG. 2 is a side plan cross-sectional assembly view of the bearing structure in accordance with a first embodiment of the present invention.

Referring to the drawings and initially to FIGS. 1 and 2, a bearing structure in accordance with a first embodiment of the present invention comprises a bearing 1 having a shaft hole 10, an inner wall 11, multiple outer walls 12, and multiple deformable zones 13. The multiple outer walls 12 are extending around sections of a periphery of the bearing, each of the outer walls having a same radius relative to a center of the shaft hole. Each deformable zone 13 is provided between a respective two outer walls 12 and extends inwardly thereof to form a gap A between the deformable zone and a shaft tube 20 when the bearing 1 is mounted in the shaft tube 20. The deformable zones therefore may be deformed to absorb stress on the outer walls. The inner wall 11 of the bearing 1 forms a shaft hole 10 so that a shaft 22 may pass through and rotate in the shaft hole 10. The multiple outer walls and the multiple deformable zones 13 together form the outer periphery of the bearing 1. Shaft tube 20 is axially mounted on the outer walls 12 of the bearing 1, so that the shaft tube 20 may be fixed relative to the bearing 1. When the shaft tube 20 is combined with the bearing 1, the bearing 1 is axially fitted into the through hole 21 of the shaft tube 20 is a close fit manner.

As shown in FIG. 2, in accordance with the first embodiment of the present invention, the multiple outer walls 12 and the multiple deformable zones 13 are distributed around the outer periphery of the bearing 1 in a staggered manner, and each of the multiple deformable zones 13 has a proper size and a regular surface shape (such as curve, plane or the like), thereby facilitating the center of mass of the bearing 1 aligning with the center of the shaft hole 10 of the bearing 1. In the position distribution of the multiple deformable zones 13, the multiple deformable zones 13 are distributed relative to the center of the shaft hole 10 of the bearing 1 in a symmetric and balanced manner, thereby preventing the center of mass of the bearing 1 from deviating from the center of the shaft hole 10 of the bearing 1. In accordance with the first embodiment of the present invention, the bearing 1 is provided with three deformable zones 13. The center of each of three deformable zones 13 forms an included angle of 120 degrees relative to the center of the shaft hole 10 of the bearing 1.

Again referring to FIG. 2, when the bearing 1 is combined with the shaft tube 20 during a punching process, a gap "A" is formed between each of the deformable zones 13 of the bearing 1 and the inner wall 21 of the shaft tube 20. Thus, when an excessive outer stress is applied on the outer wall 12 of the bearing 1, the deformable zones 13 of the bearing 1 will produce a structural deformation which is limited in the gap "A" without being expanded to the inner wall 11 of the bearing 1, thereby preventing from reducing the inner diameter of the shaft hole 10, and thereby preventing from affecting rotation of the shaft 22, so as to increase the lifetime of the bearing 1 and the shaft 22.

Figure 3:
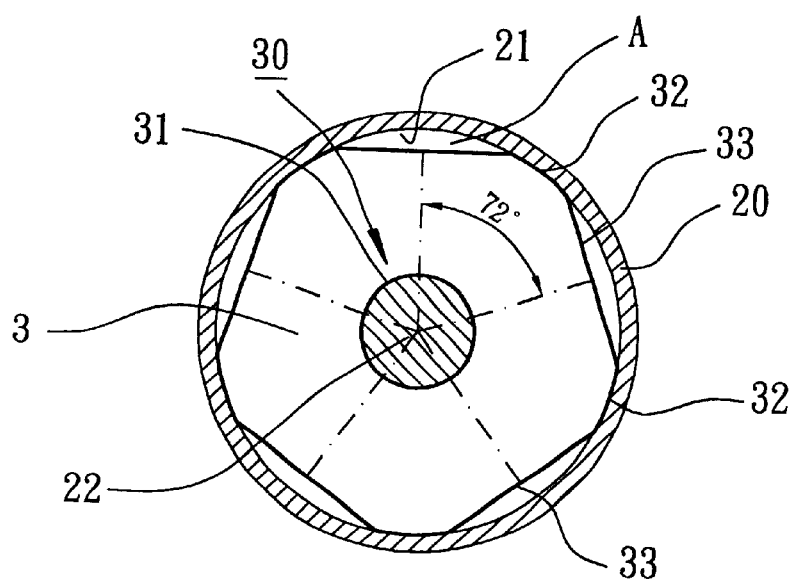
FIG. 3 is a side plan cross-sectional assembly view of the bearing structure in accordance with a second embodiment of the present invention.
Figure 4:
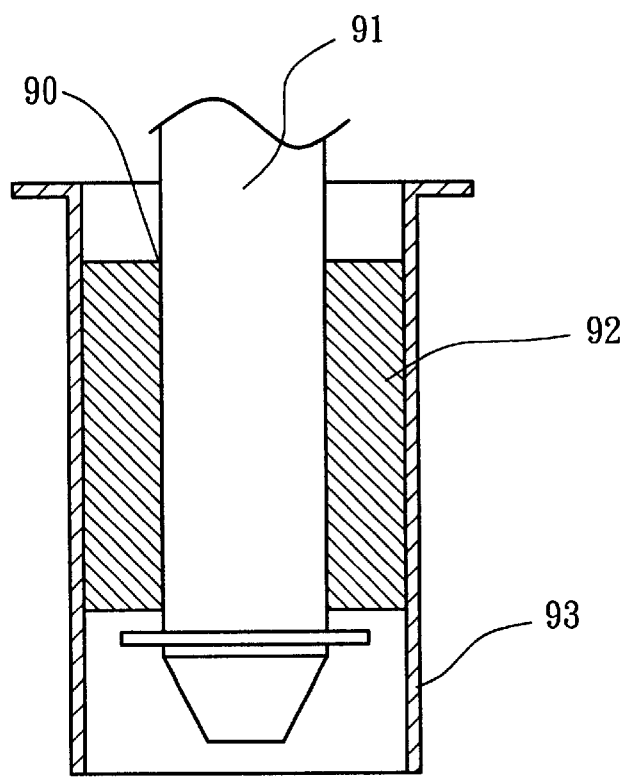
FIG. 4 is a cross-sectional view of a conventional bearing mounted in a shaft tube in accordance with the prior art.

Referring to FIG. 3, a bearing structure in accordance with a second embodiment of the present invention comprises a bearing 3 having a shaft hole 30, an inner wall 31, multiple outer walls 32, and multiple deformable zones 33. The outer walls 32 and the deformable zones 33 are distributed around the outer periphery of the bearing 3 in a staggered manner. In the position distribution of the multiple deformable zones 33, the multiple deformable zones 33 are distributed relative to the center of the shaft hole 30 of the bearing 3 in a symmetric and balanced manner, thereby preventing the center of mass of the bearing 3 from deviating from the center of the shaft hole 30 of the bearing 3. In accordance with the second embodiment of the present invention, the bearing 3 is provided with five deformable zones 33. The center of each of five deformable zones 33 forms an included angle of 72 degrees relative to the center of the shaft hole 30 of the bearing 3.

Again referring to FIGS. 2 and 3, the numbers of the deformable zones of the first and second embodiments are different from each other, but the deformable zones of the first and second embodiments are used to support the deformation produced by the close fit during the punching process.

Figure 5:
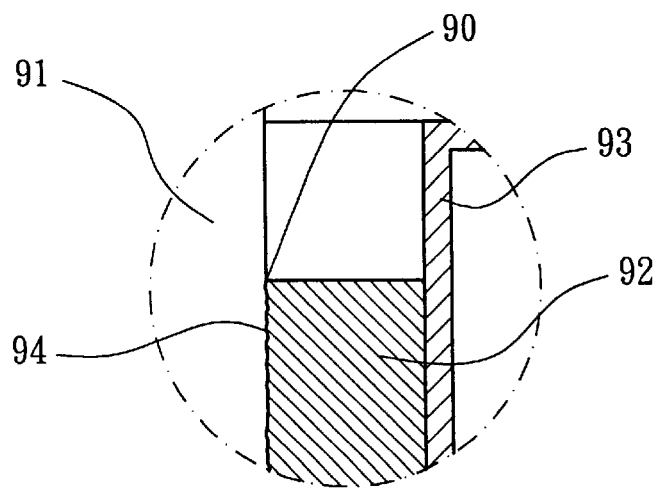
FIG. 5 is a locally enlarged view of a conventional bearing mounted in a shaft tube in accordance with the prior art.

Again referring to FIGS. 2, 3 and 5, multiple gaps "A" are formed between the bearing and the shaft tube, so as to form space of deformation produced by the close fit during the punching process, thereby preventing or reducing the inner wall of the bearing from producing deformation when the bearing is fitted in the shaft tube in a close fit manner during the punching process, and thereby preventing the shaft hole of the bearing from being deformed. On the contrary, the conventional bearing is closely fit with the shaft tube in the punching process. The outer periphery of the bearing is not provided with the deformable zone, so that the shaft hole of the inner wall of the bearing is easily deformed during the punching process.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A bearing structure, comprising a bearing, the bearing including:

a shaft hole, formed by an inner wall of the bearing;

spaced multiple outer walls extending around sections of a periphery of the bearing, each of the outer walls having a same radius relative to a center of the shaft hole, the multiple outer walls being axially and closely mounted in a shaft tube;

multiple deformable zones, each provided on a periphery of the bearing between a respective two of said spaced multiple outer walls, and each being deformable to absorb all or a part of stress on said multiple outer walls, wherein said deformable zones are situated inwardly of said outer walls such that gaps are present between said deformable zones and said shaft tube upon mounting of said bearing in the shaft tube.

2. The bearing structure as claimed in claim 1, wherein each of the multiple deformable zones has a proper size and a regular surface shape, and the multiple deformable zones are distributed around the outer periphery of the bearing symmetrically.

3. The bearing structure as claimed in claim 1, wherein the bearing has three deformable zones, and the center of each of three deformable zones forms an included angle of 120 degrees relative to the center of the shaft hole of the bearing, so that the center of mass of the bearing is aligned with the center of the shaft hole of the bearing.

4. The bearing structure as claimed in claim 1, wherein the bearing has five deformable zones, and the center of each of five deformable zones forms an included angle of 72 degrees relative to the center of the shaft hole of the bearing, so that the center of mass of the bearing is aligned with the center of the shaft hole of the bearing.

5. The bearing structure as claimed in claim 1, wherein each of the multiple deformable zones is a plane.

* * * * *